UNITED STATES PATENT OFFICE.

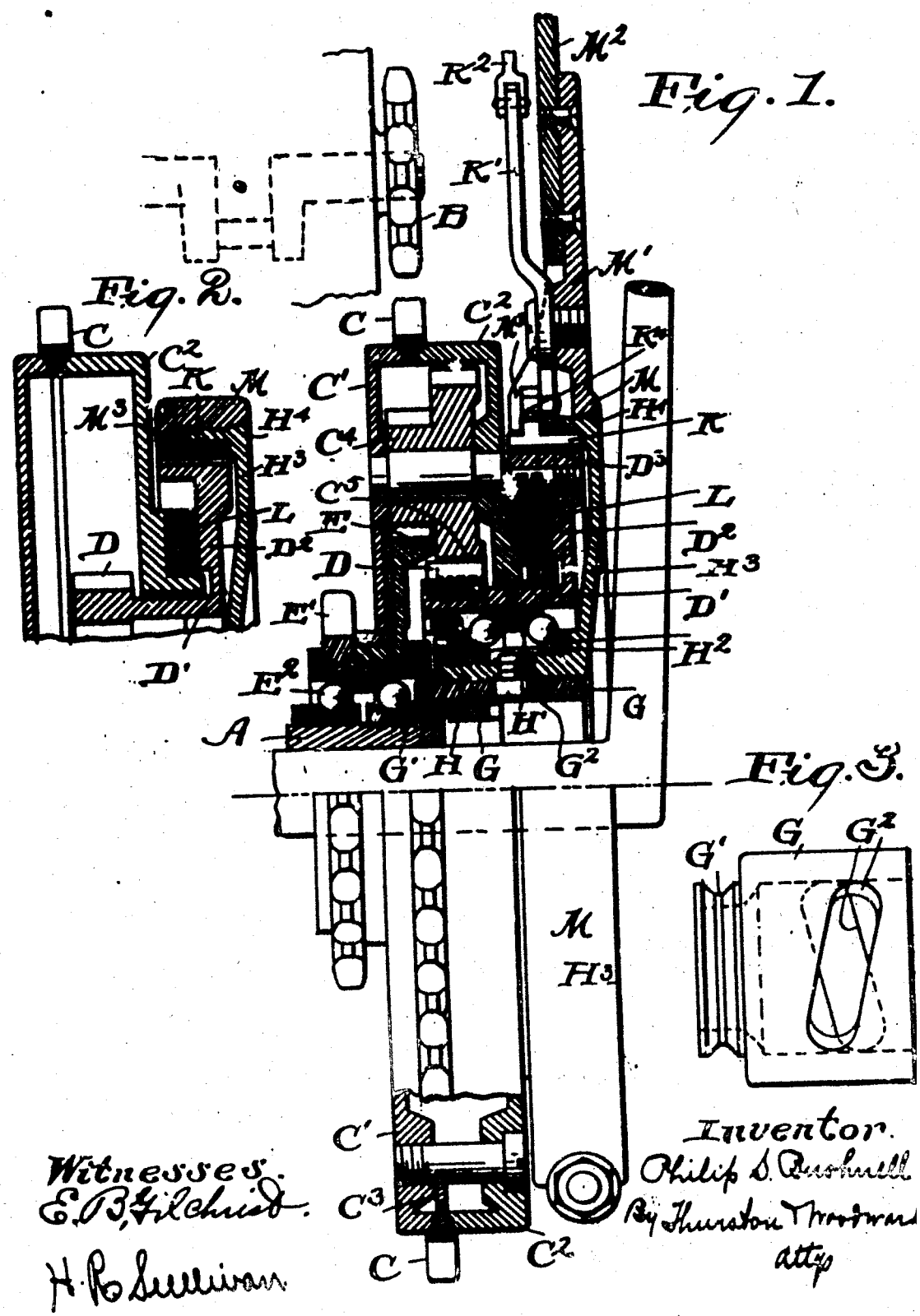

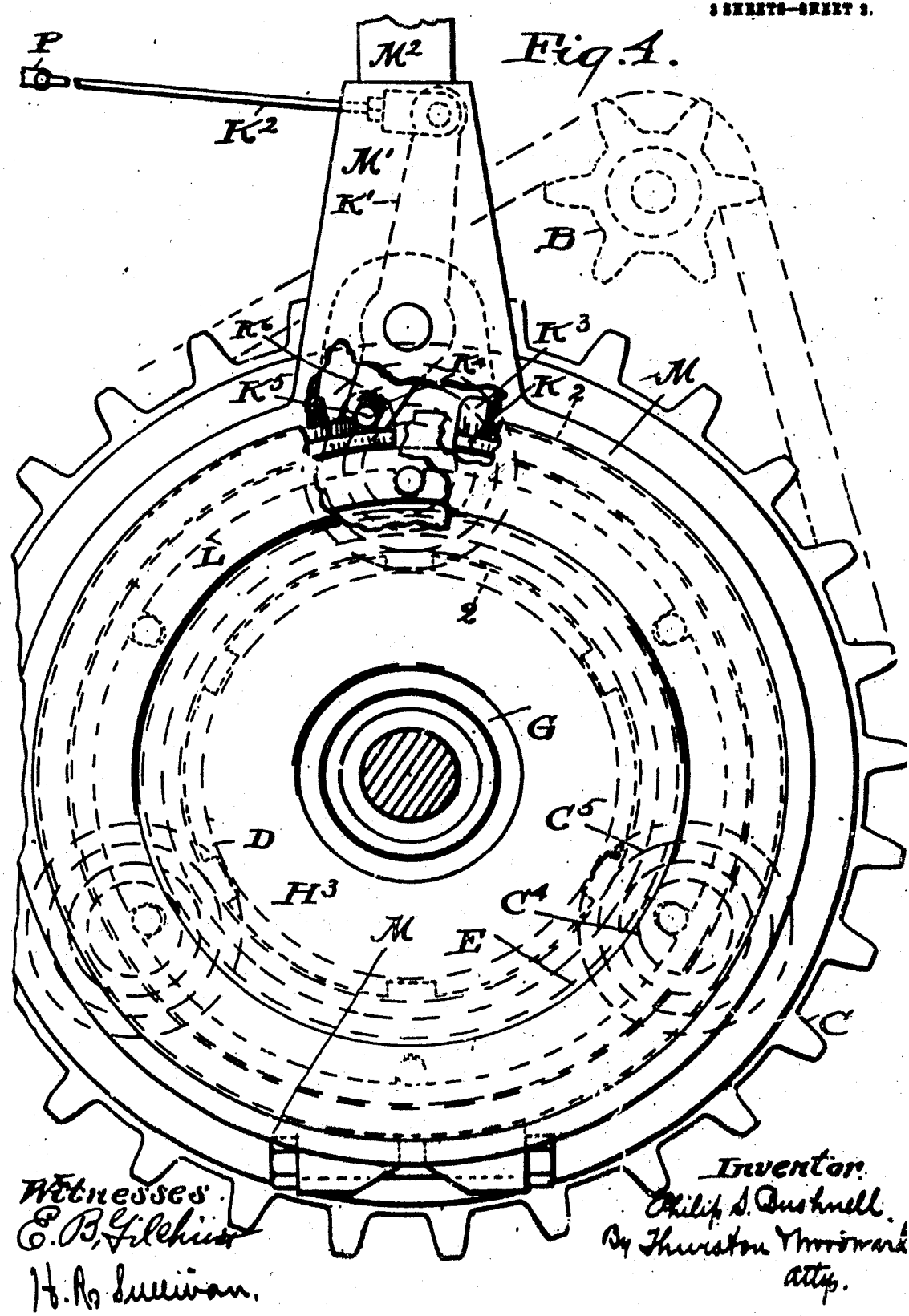

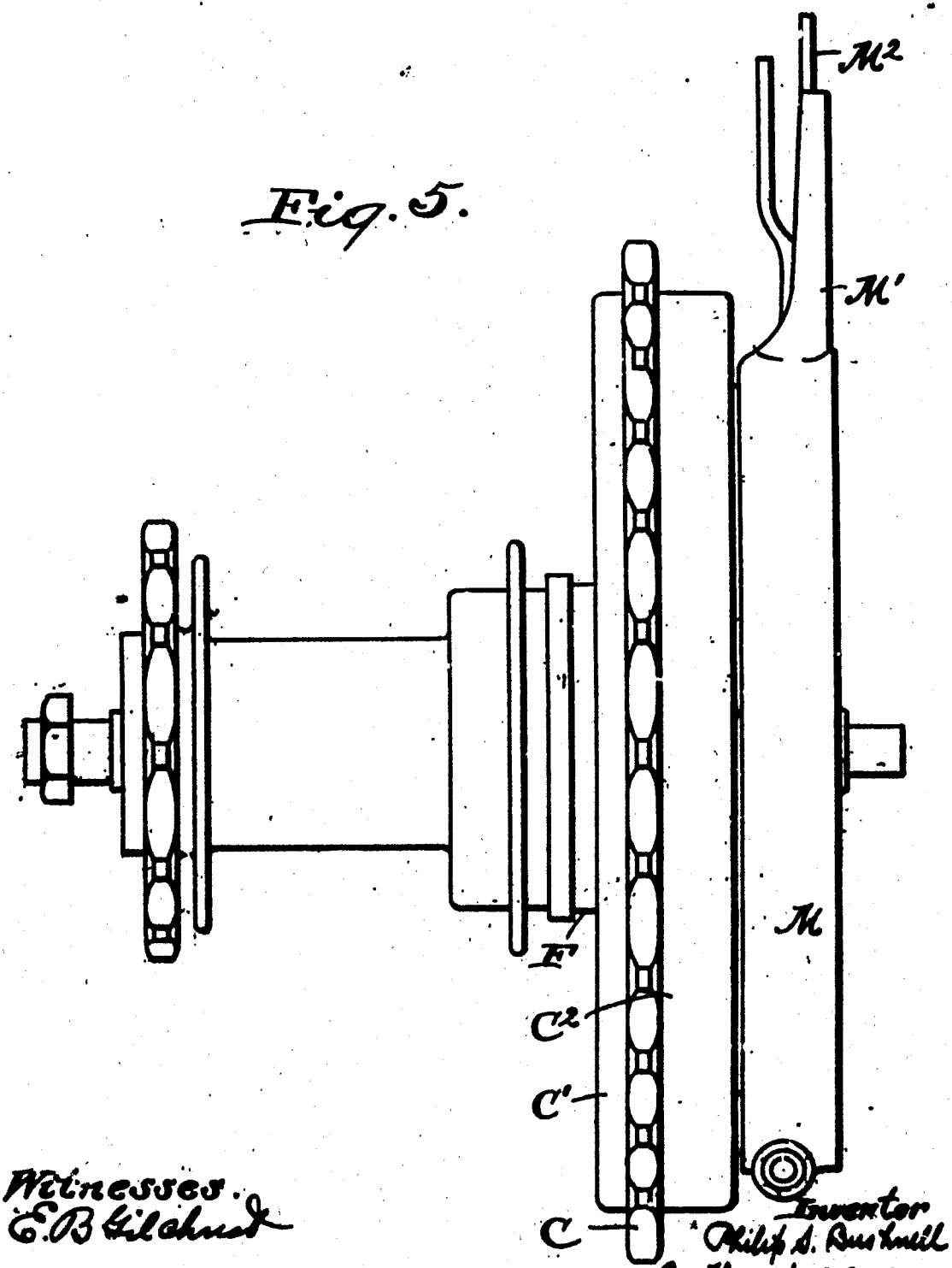

PHILIP S. BUSHNELL, OF LAKEWOOD, OHIO, ASSIGNOR OF ONE-HALF TO CHARLES B. CANNON, OF CLEVELAND, OHIO.

TRANSMISSION MECHANISM FOR MOTOR-CYCLES.

948,633.    Specification of Letters Patent.    Patented Feb. 8, 1910.

Application filed April 10, 1908. Serial No. 436,245.

*To all whom it may concern:*

Be it known that I, PHILIP S. BUSHNELL, a citizen of the United States, residing at Lakewood, in the county of Cuyahoga and State of Ohio, have invented a certain new and useful Improvement in Transmission Mechanism for Motor-Cycles, of which the following is a full, clear, and exact description.

The object of the present invention is to provide an improved transmission mechanism for motor cycles.

Particularly my invention is directed to a transmission device by which the power is transmitted from the engine to the driving wheel in such manner as to be under the control of the operator, to effect desired variations in speed.

The mechanism which I have constructed is especially designed to provide for a high and a low speed and also to permit a free running of the engine without the transmission of motion to the driving wheel: all of which is attained by the operation of a single lever under the control of the rider.

It has been an additional object of mine in constructing this device to render it compact, that is to say, of comparatively little thickness so that it may be adapted for its position on the cycle, and to so assemble the parts that they shall retain their proper position when assembled and shall be inclosed in a dust proof casing, whereby they are protected during their operation.

The above and other objects it will be seen are attained by the embodiment of my invention described in the following specification with reference to the accompanying drawings, in which:

Figure 1 is an elevation partly in section of the transmission device applied to a motor cycle frame at the crank box. Fig. 2 is a detail transverse section, being taken on the line 2—2 of Fig. 4. Fig. 3 is a plan of a slotted sleeve fixed to the frame, the slots of which are utilized for throwing the friction plate into and out of position. Fig. 4 is a side elevation partly broken away, looking from the right hand of Fig. 1. Fig. 5 is an edge elevation of my device as it appears when applied to the hub of a driving wheel.

Referring to Fig. 1, it will be seen that the mechanism, as a whole, is supported upon a fixed part A of the frame in such manner that the sprocket wheel B of the engine shaft is in vertical alinement with the large sprocket wheel C of the transmission device. This large sprocket wheel is held on a drum composed of two members $C'$ $C^2$ suitably secured together by means of cap screws and is rotatably rigid therewith by reason of inwardly projecting forks $C^3$ which straddle the shanks of the screws used for securing the two members of the drum together. Journaled on studs inside the drum are compound pinions $C^4$ $C^5$, of which I have shown three sets, one of said pinions $C^5$ meshing with a gear D on the hub $D'$ of a friction plate $D^2$, the other and small pinion $C^4$ meshing with a gear E rigid with the transmission sprocket $E'$, in such cases as those shown in Fig. 1 where the mechanism is mounted at the crank of the frame, but rigid with the hub F where the mechanism is mounted upon the driving wheel as in Fig. 5. As shown, the drum is mounted upon the hub of the last mentioned gear E and is free to rotate relatively thereto. The said gear E is itself mounted upon ball bearings $E^2$ which are held thereto by any suitable means. In the present instance, I have shown such means as comprising a cone raceway $G'$ upon a fixed sleeve G which has cam slots $G^2$ therein, shown in Fig. 3, for a purpose hereinafter described. A sliding sleeve H is carried upon the fixed sleeve G in such manner as to be rotatable relative thereto within certain limits set by said slots $G^2$ and studs $H'$ fixed to the sliding sleeve and fitted within said slots. The said sliding sleeve has carried on its periphery raceways $H^2$ for ball bearings which support the hub $D'$ of the gear D rigid with the friction plate $D^2$ above mentioned. Said friction plate has a peripheral face $D^3$ adapted for engagement with a brake band K described below, and has between its inner face and the outer face of the drum a plurality of ordinary friction rings L, the alternate members of these friction rings being supported by the friction plate and movable therewith. Any suitable arrangement of friction rings may be used, this detail forming no material feature of my invention in itself.

The sliding sleeve H has at its outer end a face plate $H^3$ which incloses and protects the parts just described, and has on its periphery a groove $H^4$ to which is fitted a band M rotatably adjustable thereon. From this band projects an arm M' to which the operating lever M² is attached. On this arm M' also is pivoted a short rocking lever K', the upper end of which has a link connection K² with a fixed part P of the frame, so that the movement of the operating lever will cause the rocking lever to move in one direction or the other according to the motion of said operating lever M².

The brake band K encircles the periphery of the friction plate described, and lies under an overhanging and retaining flange M³ of the band M, which flange terminates at each side of the arm M' to which the operating lever is secured. One end of the brake band has an outwardly extending projection K³, as seen in Fig. 4, which projection takes against the end of the overhanging flange M³ on said band M, while the other end of the brake band is provided with a secured projection K⁴ carrying a suitable lug K⁵ projecting into a fork K⁶ at the end of the rocking lever, so as to be movable with said lever.

Referring to Figs. 1 and 3, particularly, it will be seen that by movement of the operating lever M² in one direction, the pins H' on the sliding sleeve H, coöperating with the slots G² in the fixed sleeve G will cause the said sliding sleeve to move inward carrying with it, on the ball bearings supported thereby, the friction plate D² so as to clamp the friction rings L between said plate and the face of the drum, thus locking the plate and drum together so far as rotative movement is concerned. The gear D rigid with said friction plate, it will be noted, is of sufficient width to permit this movement to take place and at the same time maintain a constant engagement with its meshing mate C³ of the compound pinion gear supported within the drum. A movement from this extreme position of the operating lever toward the other direction will permit the friction rings L to become loose. A further continued movement of the operating lever in the same direction will cause the oscillating lever, one end of which is connected by a link with the frame, to throw the free end of the friction band down onto the peripheral face of the friction plate and thus lock the same against any rotation whatever. When the operating lever is thrown to that extreme position at which the sliding disk is drawn inwardly carrying the friction plate and the friction rings over against the drum so as to lock said plate and its rigid gear against rotative movement relative to the drum; it will be obvious that the compound pinions carried in the drum will not rotate upon their bearings, but will remain relatively rigid within the drum and thus transmit the high speed of the drum directly to the gear E which is rigid with the transmission sprocket or, in the construction shown in Fig. 5, rigid with the hub of the driving wheel. At this speed, which is the high speed, there will be no reduction more than that which is obtained through the different sizes of sprockets. When the operating lever is shifted to an intermediate position, such that the friction plate is moved away from the drum and the friction rings intermediate the same are loosened, the drum will race forward carrying the pinions therein which will freely rotate over the gear rigid with the transmission sprocket. This will cause the gear rigid with the friction plate to rotate idly. When the operating lever is moved on to a second extreme position, the brake band will be thrown down by the oscillating lever so as to clamp the peripheral face of the friction plate and hold the latter against all rotative movement. This will result in the compound pinions which are carried by the drum finding a resistance to rotation in the gear fixed to the friction plate and rotate in a direction which will result in the speed of the drum being reduced in transmission to the gear E.

It will thus be seen that I have provided a mechanism capable by reason of the character of its various parts of being applied to such a location as that of a motor cycle, where the thickness of the mechanism becomes a matter of great moment, and that I place all of the mechanism under the control of a single lever by which both the high and the low speeds and the free movement of the engine may be had at the option of the rider. It is further to be noted that this apparatus is of such a character that it may be applied to the frame of existing machines without necessitating any material alteration in the same.

Having thus described my invention, I claim:

1. In transmission mechanism, a drum adapted to receive motion, a compound pinion carried by said drum, a transmission gear meshing with one member of said compound pinion, a second gear coaxial with the transmission gear meshing with the other member of said compound pinion, this second gear being rigidly connected as to rotative movement with a friction plate, said friction plate being movable toward and from a position in which it is locked rotatively with the drum, and independent locking means for holding said plate against rotation, an operating handle and connections between said operating handle and both the plate and said independent locking means for moving said plate toward and from the drum and for operating said independent locking means.

2. In transmission mechanism, the combination of a rotatable gear E, a transmission gear E' secured to it, a fixture, a sleeve H mounted and adapted to be turned upon said fixture, the fixture and sleeve having the one a spiral slot and the other a pin which projects into said slot, a gear D rotatably mounted upon said sleeve and incapable of endwise movement relative thereto, an independently rotatable drum, a driving gear C secured to the periphery of said drum, a compound pinion mounted in said drum on an axis eccentric to but parallel with the axis of the drum, the two parts of said pinion being respectively in mesh with the gears D and E, and friction parts rotatable with said drum and with the gear D and adapted to be brought into frictional contact by the turning and consequent endwise movement of sleeve H.

3. In transmission mechanism, a drum adapted to receive rotary motion from an engine, a compound pinion mounted on said drum on an axis eccentric to but parallel with its axis, a gear adapted to transmit motion in mesh with one part of said pinion, a gear adapted to run idle and to mesh with the other part of said pinion, friction parts carried by said drum and by the last named gear, and adapted to be brought into frictional contact by the longitudinal movement of the latter, a coaxial rocking sleeve on which said gear is rotatably mounted by means which prevent relative longitudinal movement, means by which the turning of said sleeve causes it to move longitudinally.

4. In transmission mechanism, a drum adapted to receive rotary motion from an engine, a compound pinion mounted on said drum on an axis eccentric to but parallel with its axis, a gear adapted to transmit motion in mesh with one part of said pinion, a gear adapted to run idle and to mesh with the other part of said pinion, friction parts carried by said drum and by the last named gear and adapted to be brought into frictional contact by the longitudinal movement of the latter, an axially concentric rocking sleeve on which said gear is rotatably mounted by means which prevent relative longitudinal movement, means by which the turning of said sleeve causes it to move longitudinally, and a lever adjustably secured to said sleeve for turning it.

5. In transmission mechanism, a drum adapted to receive rotary motion from an engine, a compound pinion mounted on said drum on an axis eccentric to but parallel with its axis, a gear adapted to transmit motion in mesh with one part of said pinion, a gear adapted to run idle and to mesh with the other part of said pinion, friction parts carried by said drum and by the last named gear and adapted to be brought into frictional contact by the longitudinal movement of the latter, an axially concentric rocking sleeve on which said gear is rotatably mounted by means which prevent relative longitudinal movement, means by which the turning of said sleeve causes it to move longitudinally, and a lever adjustably secured to said sleeve for turning it, a lever K' pivoted to the last named lever, a brake band connected with its inner end in position to engage a brake surface carried by the gear D, and a link connecting the other arm of said lever K' with a fixture.

6. In transmission mechanism, the combination of a drum adapted to receive rotary motion from an engine, a compound pinion rotatably supported by said drum on an axis parallel with but eccentric to the axis of the drum, a gear engaging with one part of said pinion and adapted to transmit motion, a gear meshing with the other part of said pinion, a sleeve on which the last named gear is rotatably mounted by means which prevent its relative longitudinal movement, means whereby the turning of said sleeve compels it to move longitudinally, a face plate rigid with said sleeve, a band adjustably clamped to said face plate and carrying an operating lever.

In testimony whereof, I hereunto affix my signature in the presence of two witnesses.

PHILIP S. BUSHNELL.

Witnesses:
E. B. GILCHRIST,
H. R. SULLIVAN.